United States Patent [19]

Reichner

[11] Patent Number: 4,874,678
[45] Date of Patent: Oct. 17, 1989

[54] ELONGATED SOLID ELECTROLYTE CELL CONFIGURATIONS AND FLEXIBLE CONNECTIONS THEREFOR

[75] Inventor: Philip Reichner, Plum Boro, Pa.

[73] Assignee: Westinghouse Electric Corp., Pittsburgh, Pa.

[21] Appl. No.: 130,927

[22] Filed: Dec. 10, 1987

[51] Int. Cl.$^4$ .................. H01M 8/10; H01M 2/00; H01M 4/86

[52] U.S. Cl. ........................... 429/30; 429/31; 429/32; 429/34; 429/40

[58] Field of Search .................. 429/30–32, 429/34, 40

[56] References Cited

U.S. PATENT DOCUMENTS

| | | | |
|---|---|---|---|
| 3,206,334 | 9/1965 | Ehrenfeld | 136/86 |
| 3,702,019 | 11/1972 | Pollack | 136/34 |
| 3,835,514 | 9/1974 | Pollack | 29/2 |
| 3,895,960 | 7/1975 | Brown et al. | 136/36 |
| 4,395,468 | 7/1983 | Isenberg | 429/31 |
| 4,431,715 | 2/1984 | Isenberg | 429/31 X |
| 4,476,198 | 10/1984 | Ackerman et al. | 429/32 |
| 4,490,444 | 12/1984 | Isenberg | 429/31 |
| 4,499,663 | 2/1985 | Zwick et al. | 29/623.1 |
| 4,664,987 | 5/1987 | Isenberg | 429/31 |
| 4,725,346 | 2/1988 | Joshi | 429/30 X |
| 4,748,091 | 5/1988 | Isenberg | 429/31 |
| 4,751,152 | 6/1988 | Zymboly | 429/31 |

*Primary Examiner*—Stephen J. Kalafut
*Attorney, Agent, or Firm*—Daniel P. Cillo

[57] ABSTRACT

A flexible, high temperature, solid oxide electrolyte electrochemical cell stack configuration is made, comprising a plurality of flattened, elongated, connected cell combinations 1, each cell combination containing an interior electrode 2 having a top surface and a plurality of interior gas feed conduits 3, through its axial length, electrolyte 5 contacting the interior electrode and exterior electrode 8 contacting electrolyte, where a major portion of the air electrode top surface 7 is covered by interconnection material 6, and where each cell has at least one axially elongated, electronically conductive, flexible, porous, metal fiber felt material 9 in electronic connection with the air electrode 2 through contact with a major portion of the interconnection material 6, the metal fiber felt being effective as a shock absorbent body between the cells.

15 Claims, 2 Drawing Sheets

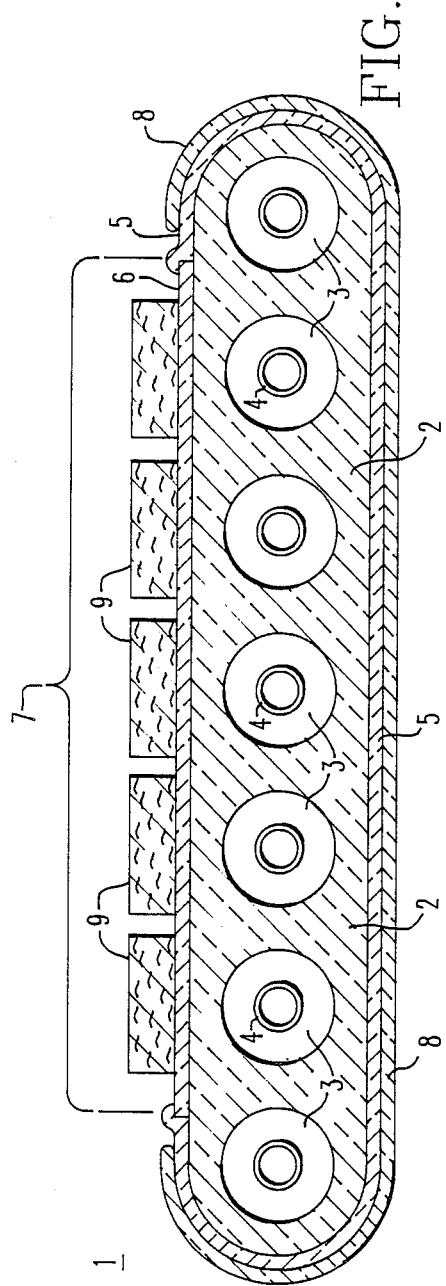
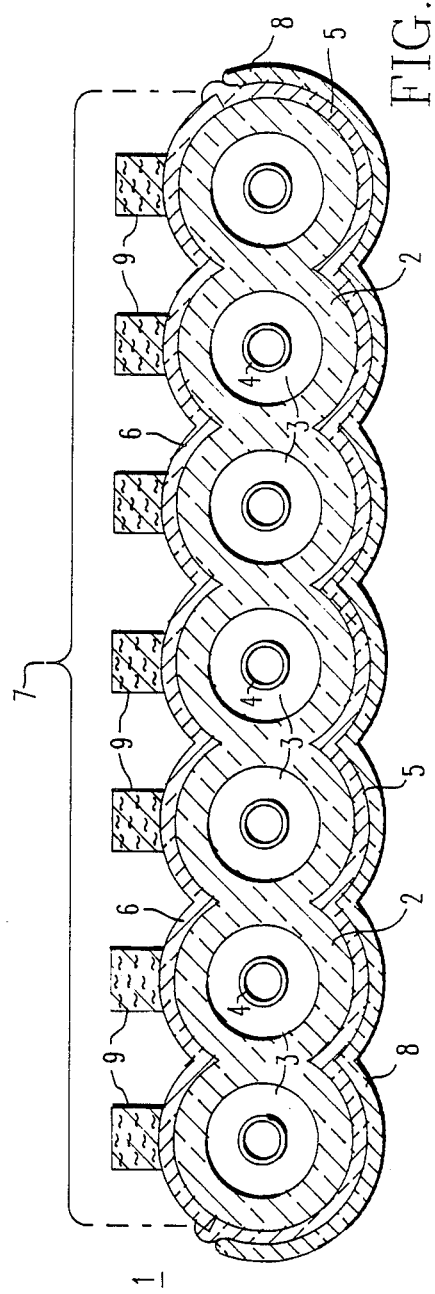

ELONGATED SOLID ELECTROLYTE CELL CONFIGURATIONS AND FLEXIBLE CONNECTIONS THEREFOR

GOVERNMENT CONTRACT

The Government of the United States of America has rights in this invention pursuant to Contract No. DEAC0280-ET17089, awarded by the U.S. Department of Energy.

BACKGROUND OF THE INVENTION

1. Field of the Invention

The present invention relates to shock resistant, flat plate, high temperature, solid oxide electrolyte, electrochemical cells and the flexible interconnection and design of such cells.

2. Description of the Prior Art

High temperature, solid oxide electrolyte fuel cells, and fuel cell generators, are well known in the art, and are taught by Isenberg, in U.S. Pat.Nos. 4,395,468 and 4,490,444. These fuel cell configurations comprise a plurality of individual, series and parallel electronically connected, axially elongated, generally tubular, separately supported, annular cells. Each cell was electronically connected in series to an adjacent cell in a column, through a narrow cell connection extending the full axial length of each cell. These connections contact the air electrode of one cell and the fuel electrode of an adjacent cell, through a conductive ceramic interconnection and a fiber metal felt strip.

A single felt strip, made, for example, of nickel fibers, bonded at contact points, extended axially between the cells. In the preferred embodiment air was flowed inside the cells and gaseous fuel outside. The nickel felt used in the preferred embodiment was about 80% to 97% porous and was generally made according to the teachings of Brown et al., in U.S. Pat. No. 3,895,960, and Pollack, in U.S. Pat. Nos. 3,702,019 and 3,835,514, all involving the use of nickel fibers and metallurgical, diffusion bonding at fiber contact points, at about 900°C to 1200°C.

Self-supporting, low circumferential voltage gradient, solid oxide electrolyte fuel cells were developed by Reichner in U.S. Ser. No. 034,245, filed on Apr. 6, 1987, and assigned to the assignee of this invention (W.E. 53,568). There, an electronically conducting central portion of the axial air electrode was utilized to strengthen the air electrode, eliminating a need for a separate support and to allow ease of electron travel to a ceramic electronically conductive, axial interconnect. The interconnection covered only a small middle section of the air electrode cross section outer top surface, and supported a fiber metal felt, which continued to be disposed parallel to the fuel cell length and gas flow. Elongated configurations, providing a flattened fuel cell with a plurality of interior gas feed chambers was also taught. Here again, all support, electrolyte, and electrode components extended the entire axial length of the cell.

Ackerman et al., in U.S. Pat. No. 4,476,198 and Zwick et al., in U.S. Pat. No. 4,499,663, taught a monolithic array of solid oxide electrolyte fuel cell elements. Here, triangular air and fuel conduits with surrounding electrodes and solid electrolyte were all fused together into an inflexible, ceramic matrix. A plurality of plates were stacked, with ceramic interconnects between them and the whole fused to a single rigid structure. This fused, triangular-element structure was advantageous in that it was very compact, providing a high surface area to volume, contained no inactive materials, and did not require a separate support structure, but, it was fragile, and provided little tolerance to thermal gradients or component shrinkage during fabrication and operation. Also, a local defect caused during manufacturing or due to degradation in operation could necessitate replacement of an entire monolithic structure.

The generator configuration of Ackerman et al., similarly to Isenberg in U.S. Pat. No. 4,395,468, had a generating section, containing the fuel cells, disposed between an oxidant preheating section and a fuel inlet section. A triangular configuration of materials in an electrochemical cell structure was also taught by Ehrenfeld in U.S. Pat. No. 3,206,334, where a nickel and iron oxide catalyst coated, cellular structure supported an electrode and electrolyte, and was a conduit for oxidant and fuel.

None of these configurations provide a flat plate, repairable design that combines higher power density in larger individual cells, along with a flexible cell array structure that would not be sensitive to thermal gradients and stresses during start-up and operation.

OBJECT OF THE INVENTION

It is the object of this invention to provide a flat plate, solid oxide electrolyte, electrochemical cell configuration, which allows large areas of flexible, electronically conductive, non-ceramic, metal fiber current collector materials, which would relieve thermal stress during operation of the multi-cell generator.

SUMMARY OF THE INVENTION

The above needs and object have been met by the present invention, which in its broadest aspect provides a high temperature, solid electrolyte, flat, axially elongated electrochemical cell combination, where a major portion of the top surface contains non-porous ceramic interconnection material, supporting flexible, porous, metallic fiber strip current collectors. More specifically, the cell combination comprises an air electrode having a top surface and a plurality of gas feed chambers through its cross section and parallel to its axial length, electrolyte covering the air electrode except for a major portion of the air electrode top surface, which major portion of air electrode surface is covered by non-porous, ceramic interconnection material, and a fuel electrode contacting a major portion of the electrolyte, each cell combination having at least one of axially elongated, electronically conductive, flexible, porous, metal fiber felt current collector material, in electronic connection with the air electrode through the interconnection material.

These electrochemical cell combinations can be placed next to each other and, through the metal fiber felts, connected in series to provide an electrochemical cell assembly. This assembly in turn can be placed in a housing where a first gaseous reactant is flowed to the air electrodes to contact the air electrodes, and a second gaseous reactant is flowed to the fuel electrodes to contact the fuel electrodes. In such an assembly, a central electrochemical cell has its fuel electrode electronically contacted in series to the air electrode of the cell below it. Said electrochemical cell has its air electrode electronically connected in series to the fuel electrode of the cell above it.

The air electrode is preferably self-supporting, and is electronically connected to the flexible, porous, metal fiber felts through an electronically conductive, non-porous, ceramic interconnection material. The cells can be of a flattened design, having circular, square, triangular, or other type geometry for the interior gas conduits. This cell configuration permits large, top areas of the width of the cells to be connected, using a highly flexible, metal fiber felt, along the entire axial length of the cells, relieving stress during operation of the cell generator and making the cell stack configuration, non-rigid and non-fragile. Flattening the cell allows short electrical current paths and thinner air electrode walls, lowering gas diffusion resistance and electrical resistance The use of large interconnection and metal fiber felt widths allows construction of more economical, larger fuel cell layers without fear of breakage due to thermal and mechanical shock. The essential, porous, metal fiber felt acts as a cushion as well as electronic conductor and current collector.

BRIEF DESCRIPTION OF THE DRAWINGS

The invention will become more readily apparent from the following description of preferred embodiments thereof shown, by way of example only, in the accompanying drawings, wherein:

FIG. 1, which best illustrates this invention, is a section through a flat plate electrochemical cell combination showing a flat, extended, non-porous, conductive interconnection, and attached, extensive, flexible, porous, metal fiber, top felts;

FIG. 2, is a modification of the cell combination of FIG. 1, showing a plurality of curved top surfaces;

DESCRIPTION OF THE PREFERRED EMBODIMENTS

Figure 3:
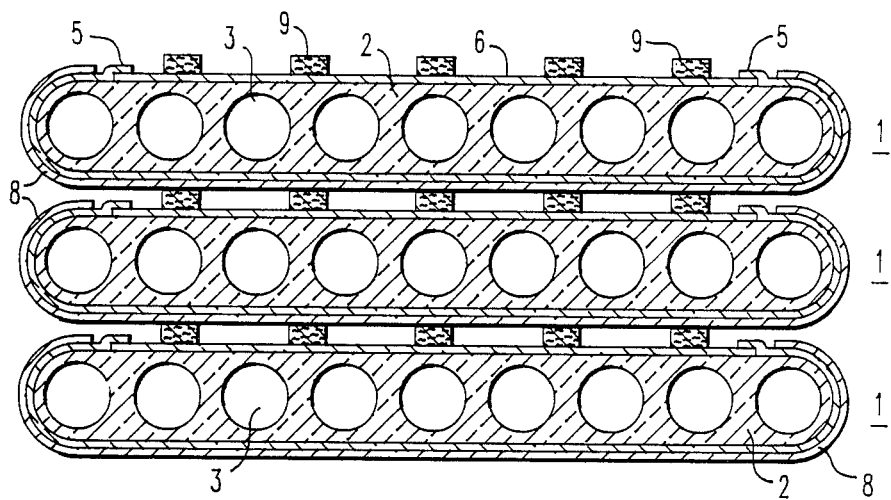
FIG. 3, is a section through three flat plate electrochemical cell combinations, showing flexible, porous, series connection along a major portion of each cell's width.

Referring now to FIG. 1, a flat cross-section electrochemical cell combination 1 is shown. This flattened cell is axially elongated and contains a porous, air electrode 2, preferably self-supporting as shown, having a plurality of interior gas feed chambers 3 through its cross-section and parallel to its axial length. The air electrode top surface is shown flat in this embodiment. The gas feed chambers may, optionally, contain gas feed tubes 4, in which case the chambers 3 would be closed at one end. The gas exiting from the feed tube, into the closed end of chamber 3 would then pass through the space along the cell length to exhaust at the open end of the chamber. Preferably, the ratio of cross-sectional thickness of air electrode:cross-sectional width of the non-porous interconnection 6 shown generally as 7, of these flattened cells is from about 1:4–50. The air electrode may be a chemically modified oxide or mixture of oxides including $LaMnO_3$, $CaMnO_3$, $LaNiO_3$ and $LaCrO_3$. A preferred material is $LaMnO_3$ doped with Sr.

An interconnection 6, about 20 microns to about 100 microns thick, and typically made of lanthanum chromite doped with calcium, strontium, or magnesium, continuously covers a wide, major segment 7 along the top portion of the air electrode defining the air electrode top surface, and continues down the axial length of the air electrode. The interconnection material 6, which is a non-porous ceramic, can be as wide as the width of the air electrode, and is disposed into a discontinuity of the fuel electrode. This substantial interconnection coverage is from about 60% to about 100%, preferably about 75% to about 95%, of the air electrode cross-sectional width. The interconnection material 6 must be electrically conductive and chemically stable both in an oxygen and in a fuel environment.

The remaining balance of the porous air electrode surface is covered by a gas-tight, non-porous, solid electrolyte 5, typically yttria stabilized zirconia, about 20 microns to 100 microns thick, which is shown covering the edges of the interconnect 6 in FIG. 1 to enhance gas sealing. A porous fuel electrode anode 8 contacts the electrolyte, and covers substantially the whole portion of the electrolyte. A typical anode is about 30 microns to 300 microns thick. A material (not shown) which is of the same composition as the anode, may be deposited over the interconnect 6. This material is typically nickel zirconia or cobalt zirconia cermet and is similar in thickness to that of the anode.

FIG. 2 shows a modification of the cell combination of FIG. 1, where the top and bottom surfaces are not flat. These surfaces can be curved as shown, or of other configuration. Such a curved surface may allow easier access of the fuel gas to the fuel electrode especially if a metal fiber mat is used for each interior gas feed chamber as shown. FIG. 2 also shows the interconnection 6 covering a larger percentage of the air electrode cross-sectional width than in FIG. 1.

In operation, as in the prior art, a gaseous fuel, such as hydrogen or carbon monoxide, is directed to the fuel electrode, and a source of oxygen is directed to the air electrode. The oxygen source forms oxygen ions at the electrode-electrolyte interface, which ions migrate through the electrolyte material to the anode, while electrons are supplied by the cathode, thus generating a flow of electrical current in an external load circuit. A number of cell combinations can be connected in series by contact between the non-porous interconnection 6 of one cell and the anode of another cell, through the axially elongated, electronically conductive, flexible, porous, metal fiber connection felts 9, shown covering a major portion of the interconnection material 6. A more complete description of the operation of this type of fuel cell interconnection system and fuel cell generator can be found in U.S. Pat. Nos. 4,490,444 and 4,395,468, herein incorporated by reference.

The fibrous felt strips 9 are high-temperature stable. By "high-temperature stable" is meant that the fibrous strips contain fibers or other materials that have melting points greater than their 1000°C to 1200°C processing temperature. These strips usually have two fuel cell contacting sides which must be free of any protective coating. The strips 9 are from 80% to 97% porous (3% to 20% of theoretical density), preferably 90% to 97% porous. The felts must be electronically conducting and capable of remaining relatively flexible during fuel cell generator operation, to act as a cushion to any vibration, and to act to relieve stress and permit small displacements between the ceramic portions of the fuel cell stack during operation and cycling. The flexible, porous metal fiber connection felts are bonded fibers comprising nickel and selected from the group consisting of coated and uncoated metal fibers selected from the group consisting of nickel and cobalt fibers, preferably nickel fibers.

These fibers can range from about 0.38 cm. (0.15 inch) to 1.27 cm. (0.50 inch) long, and have a diameter of from about 0.0013 cm. (0.0005 inch) to 0.025 cm. (0.01 inch). The nickel or cobalt fibers can be made by well known techniques. Final metal fiber felt strip thickness is about 0.16 cm. (0.06 inch) after compression between cells. The porous fibrous strips 9 can be felted or laid down, as shown, for example in U.S. Pat. Nos. 3,895,960 and 3,835,514, respectively. Intermingled random orientations provide more contact between fibers and are preferred. The felt will preferably contain all nickel fibers. The body of fibers can be lightly pressed, to bring the fibers in contact with each other and then be diffusion bonded together, preferably in an inert atmosphere, such as hydrogen or argon gas. After diffusion bonding together, the bonded fibrous body can be easily handled, acquiring strength and structural integrity.

FIG. 3 shows series electrical connection between adjacent fuel cell combinations that can be used in this invention. The cells 1 in the vertical column shown are electrically interconnected in series, from the inner air electrode of one cell to the outer fuel electrode of the next cell through porous metal fiber felts 9. Cumulative voltage progressively increases along the cells of a column. In FIG. 3, air would be fed through the interior chambers 3 and gaseous fuel would be fed around the exterior of the cells and between the cells to contact the fuel electrodes 8. Since the fiber metal felts are from 80% to 97% porous, they can extend over a major portion, i.e., about 20% to 100% of the wide interconnection width 7, shown in FIGS. 1 and 2, fuel still being able to permeate the felts and contact the fuel electrodes. FIG. 1 shows substantial felt coverage of the interconnection.

For the purpose of equalizing temperature and cumulative generated cell potential along the cell combination length, the longitudinal air flow direction within channels 3 may be alternated from channel to channel within each cell combination, or be uniform within each cell combination and alternated from cell combination to cell combination. Also, fuel flow may be directed at right angles to the air flow, as taught by Isenberg in U.S. Pat. No. 4,664,987. Alternate layers of cell combinations may be translated by 90° to permit cross-flow of the air flow channels. The cell stacks would be contained within an insulation package and provided with ducting for gas supplies and exhaust, and with electrical leads for power take-off.

Figure 4:
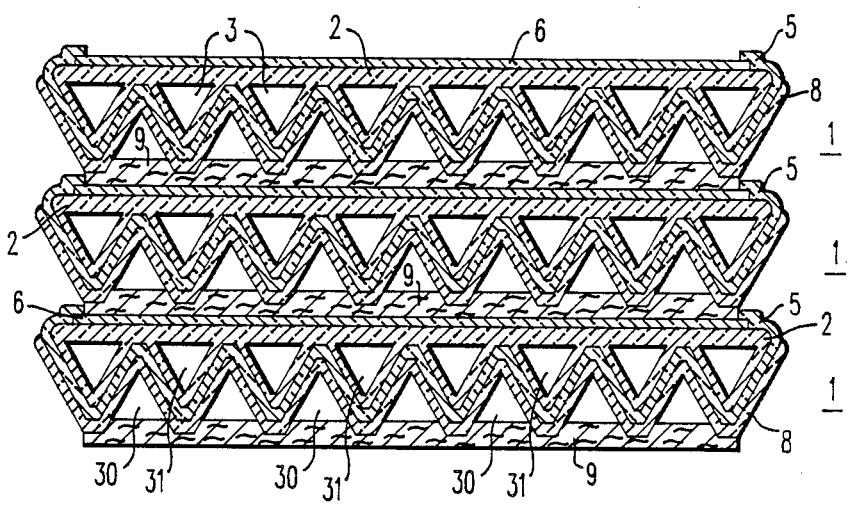
FIG. 4, is a section through another type of flat plate electrochemical cell combination, showing flexible, porous, series connection along the entire width of each cell.

FIG. 4 shows another variation in the electrochemical cell assembly configuration of this invention. Here, air and gaseous fuel can be fed through alternate chambers, for example, gaseous fuel can be fed through chambers 30 and air through chambers 31 formed by the cell stack. Here, air is kept contained by the dense electrolyte 5 and non-porous interconnection 6. Porous, flexible, metal fiber felts 9 are in contact with gaseous fuel. The gaseous fuel is kept substantially isolated by the dense electrolyte 5 and non-porous interconnection 6. This structure bears resemblance to the structure shown in U.S. Pat. Nos. 4,476,198 and 4,499,663, however, the wide layer of axially elongated, flexible, porous, compressible and expansible, fiber metal felt 9 utilized in this invention, is critical in allowing relief of thermal and mechanical stresses between ceramic portions of the cell configuration, and acts as a cushion to provide a non-monolithic structure.

I claim:

1. A high-temperature solid electrolyte, flat, axially elongated, electrochemical cell combination, having a large cushion area of flexible, current collector material, comprising: a wide, porous, inner electrode having a top surface and a plurality of axial, interior gas feed chamber, where the cross-sectional width of the inner electrode is transverse to the axial, interior gas feed chambers; solid electrolyte contacting the inner electrode except for a major portion of the inner electrode top surface; outer electrode contacting the electrolyte; non-porous; ceramic, electronically conducting interconnection material contacting the inner electrode and covering the portion of the inner electrode top surface not covered by electrolyte, where the interconnection material covers from 60% to 100% of the cross-sectional width of the inner electrode; and at least one axially elongated, electronically conductive, flexible, porous, metal fiber, current collector-cushioning strip material in electronic connection with the inner electrode through contact with from about 20% to 100% of the interconnection material width.

2. The high-temperature cell combination of claim 1, where the flexible, metal fiber current collector material comprises fibers selected from the group consisting of nickel fibers and cobalt fibers.

3. The high-temperature cell combination of claim 1, where the cell combination is a fuel cell combination, the inner electrode is an air electrode, the outer electrode is a fuel electrode, and the flexible, metal fiber current collector material is from 80% to 97% porous.

4. A plurality of the cell combinations of claim 1, where the cell combinations are fuel cells, where, in each cell combination, the inner electrode is an air electrode, the outer electrode is a fuel electrode, the interconnection material is electronically connected to a fuel electrode of an adjacent cell combination through flexible metal fiber current collector material, where fuel is fed to contact the fuel electrodes, and oxidant is fed to contact the air electrodes, where the flexible metal fiber current collector material is capable of remaining flexible during fuel cell operation and is effective to cushion adjacent cells and to act to relieve stress and permit small displacements between the components of the fuel cells during fuel cell operation.

5. A high-temperature solid electrolyte, flexible, electrochemical cell stack configuration comprising a plurality of flat, axially elongated, electrochemical cell combinations having a large cushion area of flexible, current collector material, each electrochemical cell combination comprising: a wide, porous, inner electrode having a top surface and a plurality of axial, interior gas feed chambers, where the cross-sectional width of the inner electrode is transverse to the axial, interior gas feed chambers; solid electrolyte contacting inner electrode except for a major portion of inner electrode top surface; outer electrode contacting electrolyte; non-porous, ceramic, electronically conducting interconnection material contacting inner electrode and covering the portion of inner electrode top surface not covered by electrolyte, where the interconnection material covers from 60% to 100% of the cross-sectional width of the inner electrode; and at least one axially elongated, electronically conductive, flexible, porous, metal fiber, current collector strip material in electronic connection with inner electrode through contact with a major portion of interconnection material width, said current collector material of each electrochemical cell combination contacting the outer electrode of an adjacent electrochemical cell combination, where the flexible metal fiber current collector material is capable of remaining flexible during cell stack operation, and is effective to cushion an adjacent cell combination and to relieve stress and permit small displacements between the components of the cell combinations during cell stack operation.

6. The high-temperature cell stack configuration of claim 5, where the flexible, metal fiber material comprises fibers, selected from the group consisting of nickel fibers and cobalt fibers.

7. The high-temperature cell stack configuration of claim 5 where the cells are fuel cells, the inner electrodes are air electrodes and the outer electrodes are fuel electrodes, and the flexible, metal fiber connection material is from 80% to 97% porous.

8. The high-temperature cell stack configuration of claim 7, where oxidant is fed to contact the air electrodes and fuel gas is fed to contact the fuel electrodes.

9. The high-temperature cell configuration of claim 7, where the electrolyte is yttria stabilized zirconia, the air electrode is $LaMnO_3$, and the fuel electrode is selected from the group consisting of nickel zirconia cermet and cobalt zirconia cermet.

10. The high-temperature cell stack configuration of claim 8 where the air electrode has top and bottom flat surfaces, air is fed into the interior gas feed chambers, and fuel gas is fed around the exterior of the cells to contact the fuel electrode.

11. The high-temperature cell stack configuration of claim 8 where the gas feed chambers formed by the cell stack are alternately air feed chambers which contact the air electrodes and fuel feed chambers which contact the fuel electrodes, where air is fed into the air feed chambers and fuel gas is fed into the fuel feed chambers, and where the metal fiber strip forms a continuous shock absorbent body between the interconnection material and portions of the fuel electrode of adjacent cells.

12. A high-temperature solid electrolyte, flexible, electrochemical cell stack configuration comprising a plurality of flat, axially elongated, electrochemical cell combinations, having a large cushion area of flexible, current collector material, each electrochemical cell combination comprising: a flat, wide, inner electrode having a top flat surface and a plurality of axial, interior air feed chambers, where the cross-sectional width of the inner electrode is transverse to the axial, interior air feed chambers; solid electrolyte contacting inner electrode except for a major portion of inner electrode top surface; outer electrode contacting electrolyte; nonporous, ceramic, electronically conducting interconnection material contacting inner electrode and covering the portion of inner electrode flat top surface not covered by electrolyte, where the interconnection material covers from 60% to 100% of the cross-sectional width of the inner electrode; and a flat, axially elongated, electronically conductive, flexible, porous, metal fiber, current collector strip material in electronic connection with inner electrode through contact with interconnection material, said current collector material of each electrochemical cell combination contacting portions of the outer electrode of an adjacent electrochemical cell combination, to form fuel gas feed chambers, where the flexible metal fiber current collector material is capable of remaining flexible during cell stack operation and is effective to cushion an adjacent cell combination, and where the flexible metal fiber current collector material forms a continuous shock absorbent body between the interconnection material of each cell combination and portions of the outer electrode of an adjacent cell combination.

13. The high-temperature electrochemical cell configuration of claim 12, where the flexible metal fiber material is effective to relieve stress and permit small displacements between the components of the cell combinations during cell stack operation.

14. The high temperature electrochemical cell configuration of claim 12, where oxidant is fed to the air feed chambers and fuel gas is fed to the fuel feed chambers.

15. The high temperature electrochemical cell configuration of claim 12, where the electrolyte is stabilized zirconia.

* * * * *